(No Model.)
J. MILTONBERGER.
BREAD RAISER AND CABINET.
No. 478,200. Patented July 5, 1892.
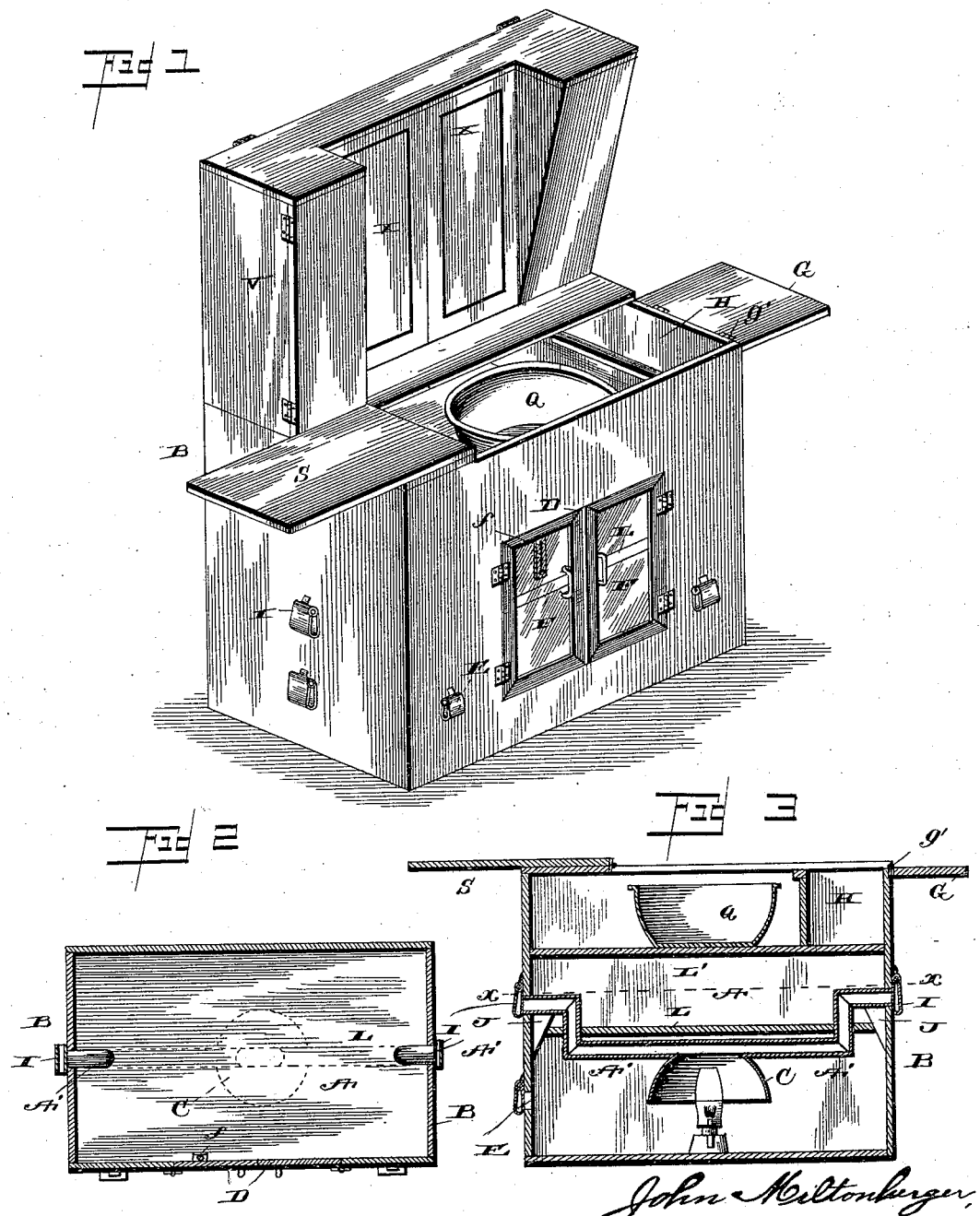

UNITED STATES PATENT OFFICE.

JOHN MILTONBERGER, OF WARSAW, INDIANA.

BREAD RAISER AND CABINET.

SPECIFICATION forming part of Letters Patent No. 478,200, dated July 5, 1892.

Application filed September 26, 1891. Serial No. 406,895. (No model.)

*To all whom it may concern:*

Be it known that I, JOHN MILTONBERGER, a citizen of the United States, residing at Warsaw, in the county of Kosciusko and State of Indiana, have invented certain new and useful Improvements in Bread Raisers and Cabinets; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in bread-raisers; and one object of the invention is the provision of an article of this character which will cause the bread or dough to raise properly, which will supply the necessary heat evenly, which can be regulated with ease, and which will permit ready observation or access to the dough.

Another object of my invention is to provide means for holding the usual utensils, and also flour and spices, and to produce an article of convenient size.

Another object of the invention is the provision of an article of this character which will occupy a small amount of space, which will be of attractive appearance, and which can be produced at such a price as to place the article within reach of all desiring it.

To attain the desired objects the invention consists in the improved bread-raiser, constructed substantially as herein disclosed by the drawings, description, and claims.

In the drawings, Figure 1 is a perspective view of my improved bread-raiser. Fig. 2 is a central vertical section taken lengthwise through the bread-raiser, and Fig. 3 is a plan view of the same.

In the drawings, B B is the outside case, which may be made of any material suitable for the purpose, and formed into the shape of a cabinet or like article. The lower part of the cabinet is enlarged and contains the dough-raising devices constructed as hereinafter described, while the upper part is adapted to contain spices and cooking utensils. The lower part has a central compartment A, provided with two shelves L and L' for the support of the dough or bread pan Q.

Access is had to the interior of the cabinet below the shelf L' by means of the doors D, which have glass fronts F, one of these doors carrying a thermometer *f* to ascertain the degree of heat which is applied to the bread.

C is a dome-shaped air-chamber, under which is placed a suitable heating device, such as a lamp or oil-stove, and the upper part of this chamber communicates with air-pipes A', which carry the smoke and products of combustion to the outside. The pipe is supported by suitable brackets J and has cut-off valves at its ends, as at I. Upon one side of the central compartment is a compartment H for the reception of flour, this being provided with a cover G, hinged at $g'$.

S is the lid of the central compartment, providing access to the same above the shelf L', and this lid serves as a bread-board when the same is opened.

E E are inlets provided for the admission of air to supply the flame of the heating device, these being also provided with suitable means for closing the openings, as shown.

The upper part of the cabinet is of less depth from front to rear than the lower part. The central part of this upper portion is adapted to hold the ordinary cooking utensils, being closed by suitable doors X X, and one side is formed into a compartment V to hold spices, salt, and articles of like nature. The compartment upon the other side forms a continuation of the flour-compartment H.

It will be understood that the described bread-raiser may be constructed of any desired material, the parts which come in contact with the hot air being constructed of metal, and the whole may be constructed and ornamented so as to present an attractive appearance. The bread is mixed in the pan 2, which rests in the central compartment above the shelf L', and is molded on the lid S, which is opened for the purpose. It is then placed upon the shelf L' and the lamp or oil-stove started, this supplying a constant and uniform heat.

It will be observed that the hood or concentrator is arranged directly over the lamp and that the pipes lead from each side of the hood through the second compartment and to openings in the casing and that the dampers are arranged over the said openings, so that one or both of them may be closed or opened, as desired, to supply the heat to either or both ends of the compartment. It will also be seen that the cold-air ducts or openings are also provided with dampers, so that the amount of cold air may be regulated or controlled and supplied to either or both sides of the casing, as circumstances require. This is an important feature, as it enables the user to supply exactly the amount of heat and avoid the danger of burning the casing or overheating the dough.

Having thus described my invention, what I claim is—

1. In a bread raiser and cabinet, the combination of the casing or housing having the lower chamber and the chamber above the same, the lamp in the lower chamber, the hood or concentrator above the lamp, the pipes leading from the hood through the chamber above, the dampers for controlling the heat-supply, and the cold-air ducts and dampers for controlling said cold-air supply, whereby the supply of hot and cold air may be directed to one or both sides of casing.

2. In a bread raiser and cabinet, the combination of the casing having the three compartments in the lower portion thereof, the lamp or heater in the lower compartment, the hood or concentrator above said heater, the pipes leading from each side of said concentrator through the compartment above and communicating with the outer air, dampers for controlling said pipes, and air-ducts having dampers for regulating the supply of cold air to the casing.

3. In a bread raiser and cabinet, the combination of the casing having the lower compartment, the compartment above said lower compartment, and the upper compartment receiving the dough-pan, the lamp or heater in the lower compartment, the hood or concentrator above the lamp, the pipes leading from each side of the hood through the compartment above to the open air, dampers for controlling the passage of heat through said pipes to cause the heat to be supplied to one or both sides of the compartment, and cold-air ducts having dampers for controlling the passage of cold air to one or both sides of the compartment, substantially as and for the purpose described.

In testimony whereof I affix my signature in presence of two witnesses.

JOHN MILTONBERGER.

Witnesses:
F. A. HESSEL,
PERRY A. MAGEE.